United States Patent
Feuerstack et al.

(10) Patent No.: US 9,793,850 B2
(45) Date of Patent: Oct. 17, 2017

(54) SYSTEMS FOR CHARGING AN ENERGY STORE, AND METHOD FOR OPERATING THE CHARGING SYSTEMS

(75) Inventors: Peter Feuerstack, Ludwigsburg (DE); Erik Weissenborn, Stuttgart (DE); Martin Kessler, Gmuend (DE)

(73) Assignee: ROBERT BOSCH GMBH, Stuttgart (DE)

(*) Notice: Subject to any disclaimer, the term of this patent is extended or adjusted under 35 U.S.C. 154(b) by 845 days.

(21) Appl. No.: 13/825,279

(22) PCT Filed: Aug. 24, 2011

(86) PCT No.: PCT/EP2011/064561
§ 371 (c)(1),
(2), (4) Date: May 29, 2013

(87) PCT Pub. No.: WO2012/038175
PCT Pub. Date: Mar. 29, 2012

(65) Prior Publication Data
US 2013/0241447 A1 Sep. 19, 2013

(30) Foreign Application Priority Data

Sep. 20, 2010 (DE) .................. 10 2010 041 075

(51) Int. Cl.
*H02J 7/00* (2006.01)
*H02P 31/00* (2006.01)
(Continued)

(52) U.S. Cl.
CPC .......... *H02P 31/00* (2013.01); *B60L 11/1814* (2013.01); *B60L 11/1816* (2013.01);
(Continued)

(58) Field of Classification Search
CPC .... H02J 7/0016; H02J 7/0024; B60L 11/1864
(Continued)

(56) References Cited

U.S. PATENT DOCUMENTS 7,456,610 B2 * 11/2008 Yamashita ............ H02J 7/0016
320/116
8,829,716 B2 * 9/2014 Tinglow ................ H02J 7/0016
307/65
(Continued)

FOREIGN PATENT DOCUMENTS

CN 101588079 11/2009
DE 10 2010 027857 10/2011
(Continued)

OTHER PUBLICATIONS

Leon M, Tolbert, et al., "Multilevel Converters for Large Electric Drives", IEEE Transactions on Industry Applications, IEEE Service Center, Piscataway, NJ, US. Bd. 35, Nr. 1, Feb. 1, 1999, XP011022532, ISSN: 0093-9994.

*Primary Examiner* — Richard Isla Rodas
*Assistant Examiner* — Johali Torres Ruiz
(74) *Attorney, Agent, or Firm* — Norton Rose Fulbright US LLP; Gerard Messina

(57) ABSTRACT

A system for charging at least one energy reservoir cell in a controllable energy reservoir for controlling/supplying electrical energy to an n-phase electrical machine. The controllable energy reservoir has n parallel energy supply branches each having at least two series connected energy reservoir modules, each encompassing at least one electrical reservoir cell having an associated controllable coupling unit. The energy supply branches are connectable to a reference bus and a respective phase of the machine. As a function of control signals, the coupling units interrupt the respective energy supply branch or bypass the cells or switch the associated cells into the respective energy supply branch. To enable charging of at least one cell, at least two phases of the machine are connectable via at least one respective freewheeling diode to a positive pole of a charging device, and (Continued)

the reference bus is connectable to a negative pole of the device.

6 Claims, 2 Drawing Sheets

(51) Int. Cl.
    *B60L 11/18*     (2006.01)
    *H02J 7/14*     (2006.01)
    *H02M 7/49*     (2007.01)

(52) U.S. Cl.
    CPC ......... *B60L 11/1864* (2013.01); *H02J 7/0016* (2013.01); *H02J 7/0019* (2013.01); *H02J 7/0024* (2013.01); *H02J 7/0055* (2013.01); *H02J 7/1492* (2013.01); *H02M 7/49* (2013.01); *B60L 2220/54* (2013.01); *H02J 2007/0059* (2013.01); *H02J 2007/0067* (2013.01); *Y02E 10/766* (2013.01); *Y02T 10/641* (2013.01); *Y02T 10/7005* (2013.01); *Y02T 10/7033* (2013.01); *Y02T 10/7055* (2013.01); *Y02T 10/7061* (2013.01); *Y02T 10/7072* (2013.01); *Y02T 10/7094* (2013.01); *Y02T 10/92* (2013.01); *Y02T 90/127* (2013.01); *Y02T 90/14* (2013.01)

(58) Field of Classification Search
    USPC .................................. 320/104, 116, 118, 122
    See application file for complete search history.

(56) References Cited

U.S. PATENT DOCUMENTS

| | | | |
|---|---|---|---|
| 2002/0146617 | A1 | 10/2002 | Johnson et al. |
| 2011/0198936 | A1* | 8/2011 | Graovac ................. H02M 7/79 307/82 |
| 2013/0154379 | A1* | 6/2013 | Tiefenbach ......... B60L 11/1853 307/77 |

FOREIGN PATENT DOCUMENTS

| | | |
|---|---|---|
| DE | 10 2010 027861 | 10/2011 |
| EP | 0 907 238 | 4/1999 |
| EP | 0 950 559 | 10/1999 |
| FR | 2 937 803 | 4/2010 |

\* cited by examiner

SYSTEMS FOR CHARGING AN ENERGY STORE, AND METHOD FOR OPERATING THE CHARGING SYSTEMS

FIELD OF THE INVENTION

The present invention relates to systems for charging an energy reservoir, and to methods for operating the charging systems.

BACKGROUND INFORMATION

It is becoming apparent that in the future, both for stationary applications such as wind power installations and in vehicles such as hybrid or electric vehicles, increasing use will be made of electronic systems that combine new energy storage technologies with electrical drive technology. In conventional applications an electrical machine, which is embodied e.g. as a phase-sequence machine, is controlled via a converter in the form of an inverter. A characteristic of such systems is a so-called DC link circuit through which an energy reservoir, usually a battery, is connected to the DC voltage side of the inverter. In order to be able to meet the demands of a particular application in terms of power output and energy, multiple battery cells are connected in series. Because the current furnished by an energy reservoir of this kind must flow through all the battery cells, and because a battery cell can conduct only a limited current, battery cells are often additionally connected in parallel in order to increase the maximum current.

A series circuit of multiple battery cells yields not only a high total voltage but also the problem that the entire energy reservoir fails if a single battery cell fails, since battery current can then no longer flow. Such a failure of the energy reservoir can result in failure of the entire system. In a vehicle, a failure of the drive battery can leave the vehicle "stranded." In other applications, for example rotor blade adjustment of wind power installations, unfavorable boundary conditions such as, for example, high wind can in fact lead to hazardous situations. A high level of reliability of the energy reservoir is therefore always desirable, "reliability" referring to the ability of a system to operate in fault-free fashion for a predetermined time.

Earlier Applications DE 10 2010 027857 and DE 10 2010 027861 discuss batteries having multiple battery module sections that are connectable directly to an electrical machine. The battery module sections have a plurality of battery modules connected in series, each battery module having at least one battery cell and an associated controllable coupling unit that makes it possible, as a function of control signals, to interrupt the respective battery module section or bypass the respectively associated at least one battery cell or switch the respectively associated at least one battery cell into the respective battery module section. By appropriate application of control to the coupling units, e.g. with the aid of pulse width modulation, it is also possible to furnish suitable phase signals in order to control the electrical machine, so that a separate pulse width modulated inverter can be omitted. The pulse width modulated inverter required in order to control the electrical machine is thus, so to speak, integrated into the battery. For purposes of disclosure, these two earlier Applications are incorporated in their entirety into the present Application.

SUMMARY OF THE INVENTION

The present invention creates a system for charging at least one energy reservoir cell in a controllable energy reservoir which serves to control and supply electrical energy to a single-phase electrical machine. The controllable energy reservoir has an energy supply branch that has at least two energy reservoir modules, connected in series, that each encompass at least one electrical energy reservoir cell having an associated controllable coupling unit. The energy supply branch is connectable on the one hand to a reference potential—hereinafter referred to as a "reference bus"—and on the other hand to the phase of the electrical machine. As a function of control signals, the coupling units either interrupt the energy supply branch or bypass the respectively associated energy reservoir cells or switch the respectively associated energy reservoir cells into the energy supply branch. In order to enable charging of at least one of the energy reservoir cells, a positive pole of a charging device is electrically connectable via at least one freewheeling diode to the phase of the electrical machine, and a negative pole of the charging device is electrically connectable to the reference bus. The charging device can then make available a DC voltage for charging at least one energy reservoir cell.

The present invention also creates a system for charging at least one energy reservoir cell in a controllable energy reservoir which serves to control and supply electrical energy to an n-phase electrical machine where n≥2. The controllable energy reservoir has n parallel energy supply branches that each have at least two energy reservoir modules, connected in series, that each encompass at least one electrical energy reservoir cell having an associated controllable coupling unit. The energy supply branches are connectable on the one hand to a reference bus and on the other hand to a respective phase of the electrical machine. As a function of control signals, the coupling units either interrupt the respective energy supply branch or bypass the respectively associated energy reservoir cells or switch the respectively associated energy reservoir cells into the respective energy supply branch. In order to enable charging of at least one of the energy reservoir cells, a positive pole of a charging device is connectable via at least one respective freewheeling diode to at least two phases of the electrical machine, and a negative pole of the charging device is connectable to the reference bus. The charging device can then make available a DC voltage for charging at least one energy reservoir cell.

The invention furthermore creates a method for operating a charging system according to the present invention for a single-phase electrical machine. The phase of the electrical machine is connected via at least one free-wheeling diode to the positive pole of the charging device, and the reference bus is connected to the negative pole of the charging device. In a charging phase, all coupling units are controlled in such a way that the respectively associated energy reservoir cells are bypassed. In a free-wheeling phase following the charging phase, all coupling units that are associated with energy reservoir cells to be charged are then controlled in such a way that the respectively associated energy reservoir cells are switched into the energy supply branch. All remaining coupling units are controlled in such a way that the respectively associated energy reservoir cells are bypassed.

Lastly, the invention creates a method for operating a charging system according to the present invention for an n-phase electrical machine where n≥2. At least two phases of the electrical machine are connected via at least one respective free-wheeling diode to the positive pole of the charging device, and the reference bus is connected to the negative pole of the charging device. In a charging phase, all coupling units of those energy reservoir modules that are located in an energy supply branch of energy reservoir cells to be charged are controlled in such a way that the respectively associated energy reservoir cells are bypassed.

All remaining coupling units are controlled in such a way that the respective energy supply branches are interrupted. In a free-wheeling phase following the charging phase, all coupling units that are associated with energy reservoir cells to be charged are then controlled in such a way that the associated energy reservoir cells are switched into the respective energy supply branch. All coupling units that are located in the energy supply branch of energy reservoir cells to be charged, but that are not themselves associated with any energy reservoir cells to be charged, are controlled in such a way that the respectively associated energy reservoir cells are bypassed, and all remaining coupling units are controlled in such a way that the respective energy supply branches are interrupted.

The present invention is based on the fundamental aspect of co-utilizing the coupling units on the one hand, and the stator windings of the electrical machine on the other hand, for a charging function. This is realized by the fact that the coupling units and the stator windings are operated, in a charging phase, analogously to a step-up converter; energy is conveyed to the stator windings and stored therein, and in a free-wheeling phase it is then conveyed to the energy reservoir cells that are to be charged. This involves only minimal additional hardware outlay for the requisite free-wheeling diodes, which is consistent with low cost and little space requirement.

The systems and methods according to the present invention make possible both the charging of energy reservoir cells of an individual energy reservoir module, and simultaneous charging of energy reservoir cells of multiple energy reservoir modules. In the case of a multi-phase electrical machine, the energy reservoir cells of energy reservoir modules that are located in different energy supply branches can also be charged simultaneously.

The purpose of the charging device is merely to make available a suitable DC voltage. The charging device can in that regard be implemented in a variety of ways. It can be configured, for example, as a grid-connected charging device. It is also immaterial in this context, with regard to the usability of the invention, whether the grid-connected charging device is single- or three-phase, or whether it is configured to be galvanically isolated or nonisolated. If the charging device encompasses a DC voltage converter (DC/DC converter), the latter can be configured for a fixed output voltage as a result of the additional adaptation stage that is created by the coupling units and stator windings operated as a step-up converter; this has an advantageous effect on its efficiency, volume, and cost.

Uniform loading of the phases of the electrical machine is desirable in order to avoid the generation of undesired torques in the electrical machine during charging operation. Provision is therefore made, according to an embodiment of the invention, that the positive pole of the charging device is connectable via at least one respective free-wheeling diode to all phases of the electrical machine. It is thereby possible to switch very quickly between the energized phases of the electrical machine, with the result that uniform loading can be achieved.

Alternatively or additionally, undesired torques during the charging operation can be avoided by mechanically blocking the electrical machine during the charging operation, for example with the aid of a linkage detent pawl. Alternatively, the rotor position of the electrical machine can also be monitored, for example with the aid of a corresponding sensor suite, and shut off in the event a rotor motion is detected.

If the inductances of the stator windings of the electrical machine are not sufficient, an additional charging inductance can be inserted between the charging device and the electrical machine, or between the charging device and the controllable energy reservoir.

Further features and advantages of embodiments of the invention are evident from the description below with reference to the appended drawings.

DETAILED DESCRIPTION

Figure 1:
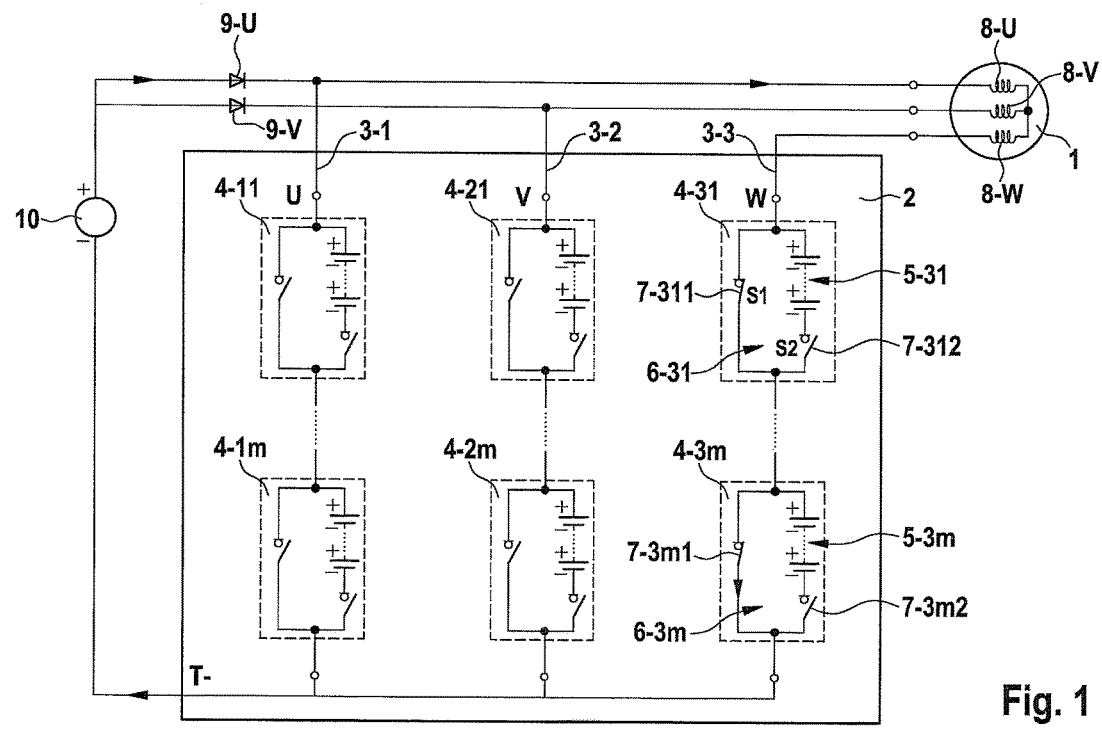
FIG. 1 schematically depicts a charging system according to the present invention in a charging phase.
Figure 2:
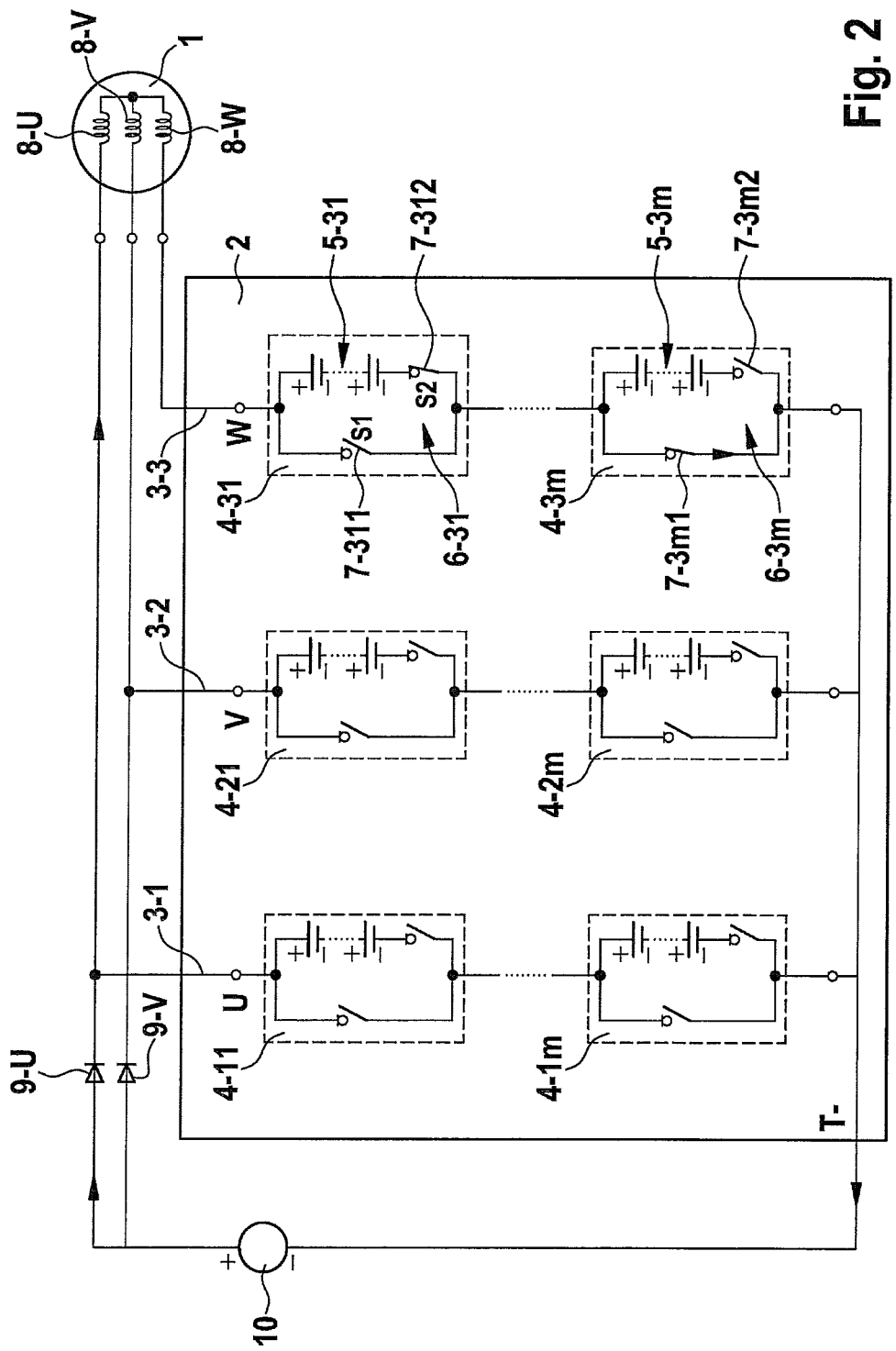
FIG. 2 shows the charging system according to FIG. 1 in a free-wheeling phase.

FIGS. 1 and 2 schematically depict a charging system according to the present invention. A controllable energy reservoir 2 is connected to a three-phase electrical machine 1. Controllable energy reservoir 2 encompasses three energy supply branches 3-1, 3-2, and 3-3, which are connected on the one hand to a reference potential T- (reference bus) that, in the embodiment depicted, carries a low potential, and on the other hand respectively to individual phases U, V, W of electrical machine 1. Each of energy supply branches 3-1, 3-2, and 3-3 has, connected in series, m energy reservoir modules 4-11 to 4-1m, 4-21 to 4-2m, and 4-31 to 4-3m respectively, where m 2. Energy reservoir modules 4 in turn each encompass multiple electrical energy reservoir cells connected in series which, for reasons of clarity, are labeled only in energy supply branch 3-3 connected to phase W of electrical machine 1, with reference characters 5-31 to 5-3m. Energy reservoir modules 4 furthermore each encompass a coupling unit that is associated with energy reservoir cells 5 of the respective energy reservoir module 4. For reasons of clarity, the coupling units too are labeled only in energy supply branch 3-3, with reference characters 6-31 to 6-3m. In the variant embodiment depicted, coupling units 6 are each constituted by two controllable switch elements 7-311 and 7-312 to 7-3m1 and 7-3m2. The switch elements can be embodied as power semiconductor switches, e.g. in the form of insulated gate bipolar transistors (IGBTs) or as metal oxide semiconductor field-effect transistors (MOSFETs).

Coupling units 6 make it possible to interrupt the respective energy supply branch 3 by opening both switch elements 7 of a coupling unit 6. Alternatively, energy reservoir cells 5 either can be bypassed by closing one of the respective switch elements 7 of a coupling unit 6, for example by closing switch 7-311, or can be switched into the respective energy supply branch 3, for example by closing switch 7-312.

The total output voltages of energy supply branches 3-1 to 3-3 are determined by the respective switching state of the controllable switch elements 7 of coupling units 6, and can be adjusted in steps. The steps occur as a function of the voltage of the individual energy reservoir modules 4. Proceeding from the embodiment of identically configured energy reservoir modules 4, what results then as a maximum possible total output voltage is the voltage of an individual energy reservoir module 4 times the number m of energy reservoir modules 4 connected in series in each energy supply branch 3.

Coupling units 6 thus make it possible to switch phases U, V, W of electrical machine 1 toward either a high reference potential or a low reference potential, and can in that regard also perform the function of a known inverter. The power output and operating mode of electrical machine 1 can thus be controlled, with appropriate application of control to coupling units 6, by controllable energy reservoir 2.

Controllable energy reservoir 2 thus performs a dual function in this regard, since it serves not only to supply electrical energy to electrical machine 1 but also to control it.

Electrical machine 1 has stator windings 8-U, 8-V and 8-W that are interconnected with one another in known fashion in a star configuration.

In the exemplifying embodiment depicted, electrical machine 1 is embodied as a three-phase rotary current machine, but it can also have fewer or more than three phases. The number of phases of the electrical machine of course also governs the number of energy supply branches 3 in controllable energy reservoir 2.

In the exemplifying embodiment depicted, each energy reservoir module 4 has multiple respective energy reservoir cells 5 connected in series. Energy reservoir modules 4 can, however, alternatively also have only a single energy reservoir cell or also energy reservoir cells connected in parallel.

In the exemplifying embodiment depicted, coupling units 6 are each constituted by two controllable switch elements 7. Coupling units 6 can, however, also be realized using more or fewer controllable switch elements, provided the necessary functions (interruption of the energy supply branch, bypassing of the energy reservoir cells, and switching of the energy supply cells into the energy supply branch) can be realized. Examples of alternative embodiments of a coupling unit are evident from the earlier Applications DE XX and DE YY. It is moreover also conceivable, however, for the coupling elements to have switch elements in a full bridge configuration, which offers the additional capability of a voltage reversal at the output of the energy reservoir module.

In order to enable the charging of energy reservoir cells 5 of one or more energy reservoir modules 4, the two phases U and V are each electrically connected, via a respective diode 9-U and 9-V, to a positive pole of a charging device 10 that is depicted in the form of an equivalent circuit diagram as a DC voltage source. Charging device 10 makes available a DC voltage suitable for charging energy reservoir cells 5, and can be embodied e.g. as a grid-connected charging device (single- or three-phase, galvanically isolated or nonisolated). The negative pole of charging device 10 is connected to reference bus T-.

The charging operation of energy reservoir cells 5 of an individual energy reservoir module 4, namely energy reservoir cells 5-31 of energy reservoir module 4-31 in energy supply branch 3-3, will be described below by way of example.

During a charging phase depicted in FIG. 1, coupling units 6-31 to 6-3m of energy reservoir modules 4-31 to 4-3m, which are located in energy supply branch 3-3 in which energy reservoir cells 5-31 to be charged are also located, are controlled by a control unit (not depicted) in such a way that the respectively associated energy reservoir cells 5-31 to 5-3m are bypassed. This is achieved concretely by the fact that switch elements 7-311 to 7-3m1 are closed, whereas switch elements 7-312 to 7-3m2 are opened. All remaining coupling units 6, i.e. all coupling units 6 in energy reservoir modules 4 of the other two energy supply branches 3-1 and 3-2, are controlled in such a way that the respective energy supply branches 3-1 and 3-2 are interrupted. Concretely, this is achieved by the fact that both switch elements 7 of the respective coupling units 6 are opened.

Application of control in this manner to coupling units 6 produces a current flow through stator windings 8, so that electrical energy is stored in stator windings 8 during the charging phase.

In a free-wheeling phase that follows the charging phase and is depicted in FIG. 2, coupling unit 6-31 that is associated with energy reservoir cells 5-31 to be charged is controlled in such a way that the associated energy reservoir cells 5-31 are switched into energy supply branch 3-3. This is achieved concretely by the fact that switch element 7-312 is closed and switch element 7-311 is opened. All remaining coupling units 6-32 to 6-3m, which are located in energy supply branch 3-3 of energy reservoir cells 5-31 to be charged, but are not themselves associated with any energy reservoir cells 5 to be charged, are controlled in such a way that the respectively associated energy reservoir cells 5-32 to 5-3m are bypassed (switch elements 7-321 to 7-3m1 closed, and switch elements 7-322 to 7-3m2 opened). Coupling units 6-11 to 6-1m and 6-21 to 6-2m in the remaining energy supply branches 3-1 and 3-2 continue to be controlled in such a way that the respective energy supply branches 3-1 and 3-2 are interrupted.

Controlling coupling units 6 in this manner produces an electrical connection between stator windings 8 and energy reservoir cells 5-31 that are to be charged. The inductance of stator windings 8 continues to drive the current, and thereby charges energy reservoir cells 5-31.

If the motor inductances are not sufficient, it is possible to use an additional external charging inductance that is inserted between charging device 10 and electrical machine 1, or between charging device 10 and controllable energy reservoir 2.

Uniform loading of the phases of electrical machine 1 is desirable in order to avoid the generation of undesired torques in the electrical machine during charging operation. The third phase W is therefore advantageously also connected, via a further free-wheeling diode (not depicted), to the positive pole of charging device 10. It is thereby possible to switch very quickly between the energized phases of electrical machine 1, with the result that uniform loading can be achieved.

Alternatively or additionally, undesired torques during the charging operation can be avoided by mechanically blocking electrical machine 1 during the charging operation, for example with the aid of a linkage detent pawl. Alternatively, the rotor position of electrical machine 1 can also be monitored, for example with the aid of a corresponding sensor suite, and shut off in the event a rotor motion is detected.

What is claimed is:

1. A system for charging at least one energy reservoir cell in a controllable energy reservoir which serves to control and supply electrical energy to an n-phase electrical machine where n≥2, comprising:
    a charging device having a negative pole and a positive pole, wherein the controllable energy reservoir has n parallel energy supply branches that each have at least two energy reservoir modules, connected in series, that each encompass at least one electrical energy reservoir cell having an associated controllable coupling unit, are connectable to a reference bus, and are connectable to a respective phase of the electrical machine, wherein there are at least two energy supply branches connected in parallel;

wherein as a function of control signals, the coupling units interrupt the respective energy supply branch or bypass the respectively associated energy reservoir cells or switch the respectively associated energy reservoir cells into the respective energy supply branch, wherein the control signals control all coupling units so that the respectively associated energy reservoir cells are bypassed during a charging phase in which energy is stored in at least one stator winding of the electrical machine via a respective connection to a DC voltage source, wherein the positive pole of the charging device that makes available a DC voltage for charging at least one energy reservoir cell is connectable via at least one respective freewheeling diode to at least two phases of the electrical machine, wherein the negative pole of the charging device is connectable to the reference bus, wherein the controllable energy reservoir includes n energy supply branches, which are connected to a reference potential of a reference bus and to individual phases of the electrical machine, wherein each of the coupling units includes two power semiconductor switches, a first one of the switches being in series with its respectively associated energy reservoir cells, and a second one of the switches being in parallel with the first one of the switches and its respectively associated energy reservoir cells, wherein during a charging phase, coupling units of energy reservoir modules of one of the energy supply branches are controlled so as to bypass the energy reservoir cells of the one of the energy supply branches by closing the second one of the switches connected in parallel, and by opening the first one of the switches connected in series, and wherein all remaining ones of the coupling units of the other n−1 energy supply branches are controlled so that the other n−1 energy supply branches are interrupted by opening all of the associated switches of the other n−1 energy supply branches, so as to produce a current flow through at least one of the stator windings, so that electrical energy is stored in the at least one of the stator windings during the charging phase.

2. The system of claim 1, wherein the positive pole of the charging device is connectable via at least one respective free-wheeling diode to all phases of the electrical machine.

3. The system of claim 1, wherein an additional charging inductance besides the at least one stator winding is insertable between the charging device and the electrical machine or between the charging device and the controllable energy reservoir.

4. The system of claim 1, wherein a third one of the phases is connected via a third free-wheeling diode to a positive pole of the charging device to switch quickly between the energized phases of the electrical machine to achieve uniform loading.

5. A method for operating a charging system, the method comprising:

connecting at least two phases of an n-phase electrical machine, where n≥2, via at least one respective free-wheeling diode to a positive pole of a charging device, and connecting a reference bus to a negative pole of the charging device;

in a charging phase, controlling all coupling units of those energy reservoir modules that are located in an energy supply branch of energy reservoir cells to be charged so that the respectively associated energy reservoir cells are bypassed while energy is stored in at least one stator winding of the electrical machine via a respective connection to a DC voltage source, and controlling all remaining coupling units so that the respective energy supply branches are interrupted; and in a free-wheeling phase following the charging phase, controlling all coupling units that are associated with energy reservoir cells to be charged so that the associated energy reservoir cells are switched into the respective energy supply branch via which the energy stored in the at least one stator winding is conveyed to the energy reservoir cells to be charged, controlling all coupling units that are located in the energy supply branch of energy reservoir cells to be charged, but that are not themselves associated with any energy reservoir cells to be charged, so that the respectively associated energy reservoir cells are bypassed, and controlling all remaining coupling units so that the respective energy supply branches are interrupted;

wherein the controllable energy reservoir includes n energy supply branches, which are connected to a reference potential of a reference bus and to individual phases of the electrical machine, wherein each of the coupling units includes two power semiconductor switches, a first one of the switches being in series with its respectively associated energy reservoir cells, and a second one of the switches being in parallel with the first one of the switches and its respectively associated energy reservoir cells, and wherein during a charging phase, coupling units of energy reservoir modules of one of the energy supply branches are controlled so as to bypass the energy reservoir cells of the one of the energy supply branches by closing the second one of the switches connected in parallel, and by opening the first one of the switches connected in series, wherein all remaining ones of the coupling units of the other n−1 energy supply branches are controlled so that the other n−1 energy supply branches are interrupted by opening all of the associated switches of the other n−1 energy supply branches, so as to produce a current flow through at least one of the stator windings, so that electrical energy is stored in the at least one of the stator windings during the charging phase.

6. The method of claim 5, wherein a third one of the phases is connected via a third free-wheeling diode to a positive pole of the charging device to switch quickly between the energized phases of the electrical machine to achieve uniform loading.

* * * * *